Dec. 12, 1950  R. ZAVARELLA  2,533,544
ROTARY HYDRAULIC COUPLING
Filed May 12, 1945
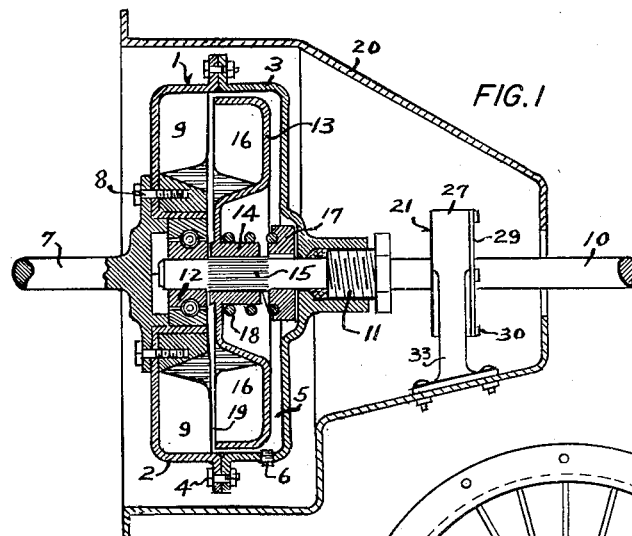
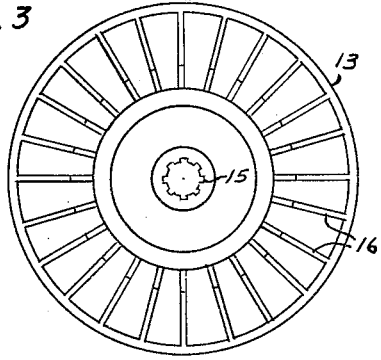
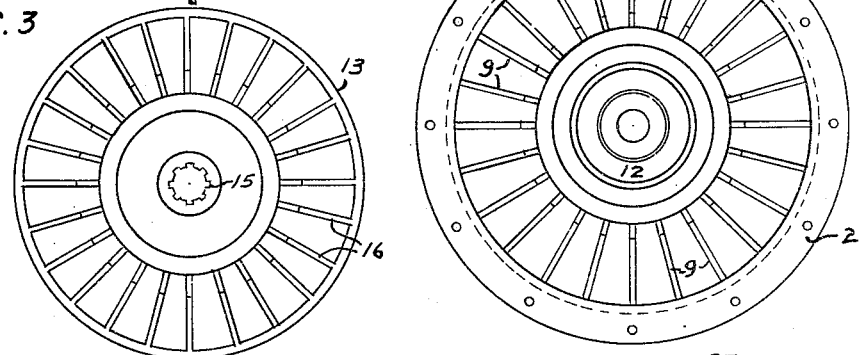
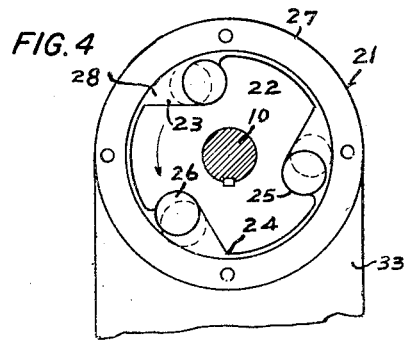
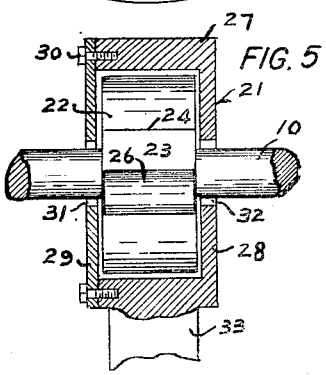
INVENTOR
RAPHAEL ZAVARELLA
BY
*Jas R Snyder*
ATTORNEY Patented Dec. 12, 1950

2,533,544

UNITED STATES PATENT OFFICE 2,533,544

ROTARY HYDRAULIC COUPLING

Raphael Zavarella, Pittsburgh, Pa.

Application May 12, 1945, Serial No. 593,364

1 Claim. (Cl. 60—54)

This invention relates broadly to a drive transmission, but more particularly to a fluid drive transmission, and while primarily designed and intended for use in connection with the operation of motor vehicles, it will be obvious that the device may be employed in connection with the operation of any other mechanisms or apparatus wherein it is found to be applicable.

Important objects and advantages of the invention are to provide a drive transmission of the character described, which is fluid driven and controlled, which functions to automatically adjust itself for maximum operating efficiency to all variations in load conditions, which includes automatically operable means for preventing the embodied driven element from rotating in the reverse direction, which is simple in its construction and arrangement, durable, compact, and comparatively economical in its manufacture, installation, operation, and maintenance.

With the foregoing and other objects in view which will appear as the description proceeds, the invention resides in the novel construction, combination, and arrangement of parts herein specifically described and illustrated in the accompanying drawing, but it is to be understood that the latter is merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claim hereunto appended.

In the drawing, wherein like numerals of reference designate corresponding parts throughout the several views:

Figure 1 is a vertical cross sectional view of a fluid drive transmission constructed in accordance with the invention.

Figure 2 is an inner end view of the transmission casing body section and of associated parts.

Figure 3 is a similar view of the transmission runner.

Figure 4 is a rear end view of the reverse locking mechanism, with the end plate removed therefrom.

Figure 5 is a side elevational view of the reverse locking mechanism with the frame shell shown in vertical cross section.

Referring in detail to the drawing 1 denotes the entire circular transmission casing, which is approximately eighteen inches in diameter.

The transmission casing comprises a forwardly disposed, dished body section 2, and a similarly shaped rearwardly disposed cover section 3. The body and cover sections are fixedly secured together by bolts 4, and combinedly provide a leakproof operating fluid chamber 5. The cover section is provided with an opening plug 6 to allow the admission of the operating fluid into the fluid chamber, and the draining of the latter when required.

The transmission casing 1 is secured to and supported at the rear end of the crankshaft 7, of an internal combustion engine, by means of bolts 8, and serves as a flywheel for the engine by replacing the usual conventional type of engine flywheel.

The interior of the body section 2 is provided with a plurality of impeller vanes 9, which are disposed radially in regularly spaced relation to each other. The vanes 9 are formed integral with the outer and side walls of the body section, and have their inner ends spaced from the diameter center of the latter.

A pinion shaft 10, adapted for having its rear end operatively connected with the conventional gear transmission of a motor vehicle in the usual manner, is horizontally aligned with the crankshaft 7. The pinion shaft extends revolubly through an impervious packing gland 11, carried by the cover section 3, and projects into the fluid chamber 5. The forward end of the pinion shaft is revolubly secured in a ball bearing 12, which latter is fixed in the body section 2, as clearly illustrated in Figure 1.

A circular, forwardly dished transmission runner 13 is mounted on the pinion shaft 10 within the fluid chamber 5. The runner is of a diameter commensurate approximately to the diameter of the fluid chamber 5, and includes a hub 14, which has a splined connection 15 with the pinion shaft, whereby the runner rotates with the pinion shaft but is longitudinally shiftable on the latter.

The interior of the runner 13 is provided with a plurality of propeller vanes 16, which extend radially in regularly spaced relation to each other. The vanes 16 are formed integral with the runner and are directly opposed to the vanes 9 carried by the body section 2 of the transmission casing 1.

A stop collar 17 is fixed on the pinion shaft 10 within the fluid chamber 5 for the abutment of the runner hub thereagainst to limit the rearward movement of the runner 13 on the pinion shaft. The forward movement of the runner on the pinion shaft is limited to the abutment of the runner hub 14 against the revoluble section of the ball bearing 12.

A comparatively strong spiral spring 18 surrounds the runner hub 14. The rear end of the spring is seated against the stop collar 17, and the forward end thereof abuts against the runner 13. The action of the spring tends to force the runner hub against the ball bearing 12 to hold the runner at its normal maximum forward position on the pinion shaft 10. When the runner is in such normal forward position, a clearance 19 of about one-quarter of an inch is established and maintained between the vanes 9 and 16 of the body section 2 and the runner 13, respectively.

It is, of course, apparent that, the entire transmission casing 1 rotates with the engine shaft 7, and that the vanes 9, carried by said rotating casing, will actuate the operating fluid to whirlpool movement to impinge on the runner vanes 16 and thereby impart like rotation to the runner 13 and to the pinion shaft 10 carrying the latter.

In analogous drive transmissions now in common use, a normal clearance of about one-quarter of an inch between opposed casing and runner vanes has definitely proven satisfactory and efficient in power transmission under ordinary conditions. It will be noted that under such ordinary operating conditions, the improved drive transmission will function with said proven clearance, as the latter is the normal clearance of the improved structure. However, in case of overload, adverse starting torque, or any other untoward operating conditions, the improved drive transmission will function automatically to extend or increase said clearance from anywhere between the normal one-quarter inch clearance to a maximum clearance of about one-half inch.

The allowed variation of the clearance 19 between opposed vanes 9 and 16 will govern the relative rotation ratio of the driving casing 1 with respect to the runner 13 and pinion shaft 10, and will automatically provide the clearance best adapted for efficient operation to meet any untoward condition found in practice. As soon as any untoward condition has been met and overcome, the action of the spring 18 will return the runner 13 to its maximum forward position on the pinion shaft, to again establish and maintain the normal clearance 19 between the opposed vanes 9 and 16, for ordinary operating conditions.

It will here be noted that the most important feature of the present invention resides in providing a drive transmission, for motor vehicles, which transmission embodies a runner 13 that is longitudinally shiftable on the associated pinion shaft 10 and operable to automatically adjust itself on the latter to provide clearance variations between the opposed vanes 9 and 16 to most efficiently meet any operating conditions found in practice. In analogous drive transmissions now in use, the runner is fixed in position on the pinion shaft, and in consequence the clearance between the vanes remains constant.

The entire improved fluid drive transmission is suitably enclosed in a sectional flywheel housing 20, which latter is adapted for being secured to and supported at the rear end of an internal combustion engine.

A locking mechanism 21, for preventing the rotation of the pinion shaft 10 in the reverse direction, is mounted in the housing 20 and is joined with said pinion shaft. The locking mechanism is automatically operable to allow the pinion shaft to revolve in the driving direction only, when said pinion shaft is driven by the operation of the engine and through the improved fluid drive transmission.

The locking mechanism 21 comprises a cam wheel 22, which is fixedly secured, in any suitable manner, on the pinion shaft 10. The periphery of the cam wheel is provided with a plurality of uniformly arranged and regularly spaced cam recesses 23. Each of the latter extends transversely across the periphery of the cam wheel, and gradually decreases in depth from its rearward to its forward end 24, which terminates at the periphery of the cam wheel.

It will here be noted that the terms "rearward" and "forward" are applied to the cam recesses 23 relatively to the direction of rotation of the cam wheel 22 with the driving direction of the pinion shaft 10, as indicated by an arrow in Figure 4.

By providing a greater depth at the rearward end of each of the cam recesses 23, a rearward end wall is formed, which is concavely curved to provide a seating pocket 25.

A locking roller 26 is mounted in each of the cam recesses 23 of the cam wheel 22. The locking rollers are disposed transversely in respective recesses and have lengths approximately commensurate to the thickness of the cam wheel. The rollers, when in the normal inoperative position, seat in the conforming recess pockets 25 and the peripheries thereof do not project beyond the periphery of the cam wheel, as clearly illustrated in Figure 4.

The cam wheel 22 is enclosed in a cylindrical frame shell 27, which has an integrally formed end wall 28. The other end of the frame shell is open and covered by an end plate 29 secured in position by screws 30. The end plate and the end wall are provided diametrically disposed openings, respectively indicated at 31 and 32, for the passage of the pinion shaft 10.

The frame shell 27 is rigidly anchored in position by an integrally formed connecting bracket 33, which latter may be securely bolted to the housing 20 or secured in any other suitable manner to provide a rigid support for the frame shell.

As clearly shown in Figures 4 and 5, no part of the cam wheel 22 frictionally engages or contacts with any part of the frame shell 27, and clearance is purposely provided between adjacent surfaces of these elements to prevent noisy contact with each other under any conditions, and consequently there is no wear to these parts, and no lubrication is required for the latter.

In the conventional motor vehicle drive transmission system, the transmission gear drive pinion shaft rotates with the engine shaft in the driving direction while driving the vehicle in either the forward or backward directions, but the said pinion shaft may turn in either direction if movement is imparted thereto through the transmission gearing, for instance, when the vehicle moves on its wheels by gravity and the transmission gearing is in mesh.

In the operation of the locking mechanism 21, the pinion shaft 10 is free to turn with the crankshaft 7 in the driving direction, but cannot revolve in the reverse or non-driving direction, as one or more of the rollers 26 will roll forwardly by gravity in its cam recess 23 and set up a wedging action between the bottom of the latter and the inner periphery of the frame shell 27, as clearly shown in dash lines in Figure 4.

While the pinion shaft 10 is rotating in the driving direction, all of the locking rollers 26 remain seated in respective recess pockets 25 by their inertia, and no revolving part of the mechanism will be in contact with the frame shell 27. It is only when there is a tendency of the pinion shaft to turn in the reverse direction that the locking rollers will automatically funcion to prevent to latter in the manner stated.

The obvious purpose of the locking mechanism 21 is to facilitate the operation of a motor vehicle equipped therewith, by preventing the latter from rolling backward by gravity while the gear transmission is either in the low, the intermediate, or the high gear position, and by preventing the vehicle from rolling forward by gravity while the gear transmission is in the reverse gear position. When the gear transmission is in neutral the locking mechanism is rightly inoperative and vehicle is free to travel in either direction.

The automatic operation of the locking mechanism 21 is particularly advantageous when starting a vehicle on a grade, as said mechanism will hold the vehicle in the starting position without the use of the brakes or without the need of other means and methods.

The present invention provides a most efficient drive transmission for motor vehicles, which may be economically manufactured, and successfully and conveniently employed to facilitate motor vehicle operations in the manner herein set forth.

What I claim is:

A fluid controlled change-speed power transmission mechanism including a driving shaft, a fluid retaining casing secured to the rear end of the driving shaft to rotate with the latter, a plurality of driving vanes secured in said casing, a ball bearing including a revoluble section secured in said casing, a driven shaft revolubly extended into said casing and being aligned with the driving shaft, the forward end of said driven shaft being secured in said revoluble section of said ball bearing, a runner including an integrally formed hub mounted in said casing, a plurality of driven vanes carried by said runner and being disposed in opposed spaced relation to said driving vanes, said hub being engaged on said driven shaft to rotate with the latter, said hub being longitudinally shiftable on said driven shaft to vary the spaced relation between said driving vanes and said driven vanes, a stop collar fixed on said driven shaft in said casing rearwardly of said hub, the abutting of the forward end of said hub against said revoluble section of said ball bearing limiting the forward movement of said runner on said driven shaft for providing the minimum spaced relation between said driving and driven vanes, the abutting of the rearward end of said hub against said stop collar limiting the rearward movement of said runner on said driven shaft for providing the maximum spaced relation between said driving and driven vanes, and a spiral spring mounted on said hub and engaging said stop collar and said runner, said spring being normally operable for forcing the said runner to the maximum forward position on said driven shaft for normally providing the minimum spaced relation between said driving and driven vanes.

RAPHAEL ZAVARELLA.

REFERENCES CITED

The following references are of record in the file of this patent:

UNITED STATES PATENTS

| Number | Name | Date |
|---|---|---|
| 1,694,181 | Kaplon | Dec. 4, 1928 |
| 2,024,698 | McDougall | Dec. 17, 1935 |
| 2,129,366 | Swennes | Sept. 6, 1938 |
| 2,161,398 | Yingling | June 6, 1939 |
| 2,318,187 | Addison | May 4, 1943 |
| 2,336,167 | Dillon | Dec. 7, 1943 |
| 2,340,494 | Smirl | Feb. 1, 1944 |